Feb. 3, 1959     L. M. PUSTER     2,872,117
THERMOSTATICALLY OPERATED VALVE
Filed Jan. 7, 1957

INVENTOR.
Louis M. Puster.
BY
*Albert J. Henderson*
HIS ATTORNEY.

United States Patent Office 2,872,117
Patented Feb. 3, 1959

2,872,117

THERMOSTATICALLY OPERATED VALVE

Louis M. Puster, Knoxville, Tenn., assignor to Robertshaw-Fulton Controls Company, Greensburg, Pa., a corporation of Delaware Application January 7, 1957, Serial No. 632,822

5 Claims. (Cl. 236—34)

This invention relates to a balanced-type thermostatically operated valve and more particularly to a choker sleeve valve that is used to control the flow of fluid in a conduit in response to temperature variations of the fluid therein.

One object of the present invention is to guide the movement of a valve member by a fluid seal.

Another object of the invention is to prevent the leakage of fluid past a valve member.

Another object of the invention is to insure a fluid pressure balance across a valve member in all of the controlling positions thereof.

Another object of the invention is to simplify the construction and arrangement of parts in a choker sleeve-type valve.

In conformity with these objects, the preferred embodiment of the invention is characterized by a valve member which is slidably mounted on a guide means, a seal and seal support and which is moved between a plurality of controlling positions relative to a valve seat formed on a support member by a spring biased thermostat. The seal is arranged to prevent the leakage of fluid past the valve member in all of the controlling positions thereof and the valve member thereby operates under a balanced fluid pressure condition.

These and other objects of the present invention will become apparent from the following description taken in connection with the accompanying drawing, wherein.

Figure 1:
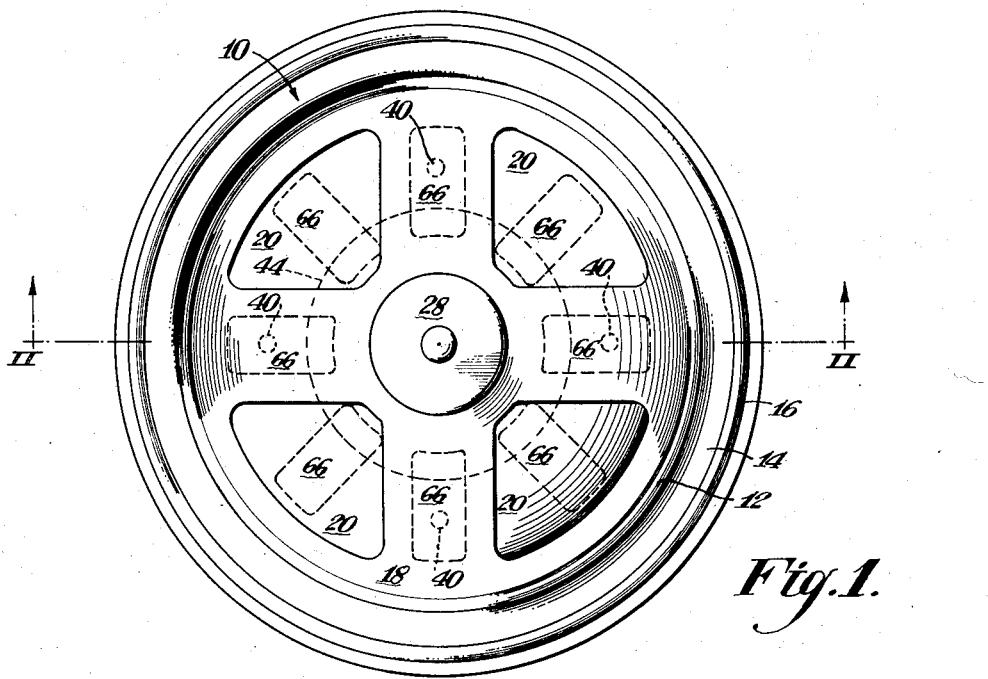
Fig. 1 is a top plan view of the valve.

Referring more particularly to the drawing, the subject valve includes a support member, generally designated by the reference numeral 10, which is comprised of an annular member or ring 12 that is provided at one end thereof with a substantially right angular, radially extending flange 14 having an annular bead 16 thereon. The opposite end of ring 12 has integrally formed therewith an upwardly and inwardly converging wall 18 which is provided with four substantially quadrant-shaped apertures or ports 20 therein. Wall 18 terminates at the inner end thereof in a cylindrical portion 22 which extends axially of support member 10 and which is located centrally thereof.

Support member 10 carries an irregular shaped housing 24 having a chamber 26 extending from the larger end thereof and provided with an end wall 28 with a centrally located recess 30 therein. The housing 24 is provided with a reduced diameter, cylindrical portion 32 which is bound at one end by a frustoconical segment 34 of the housing 24 and which is bound at the opposite end by an annular bead 36.

Figure 2:
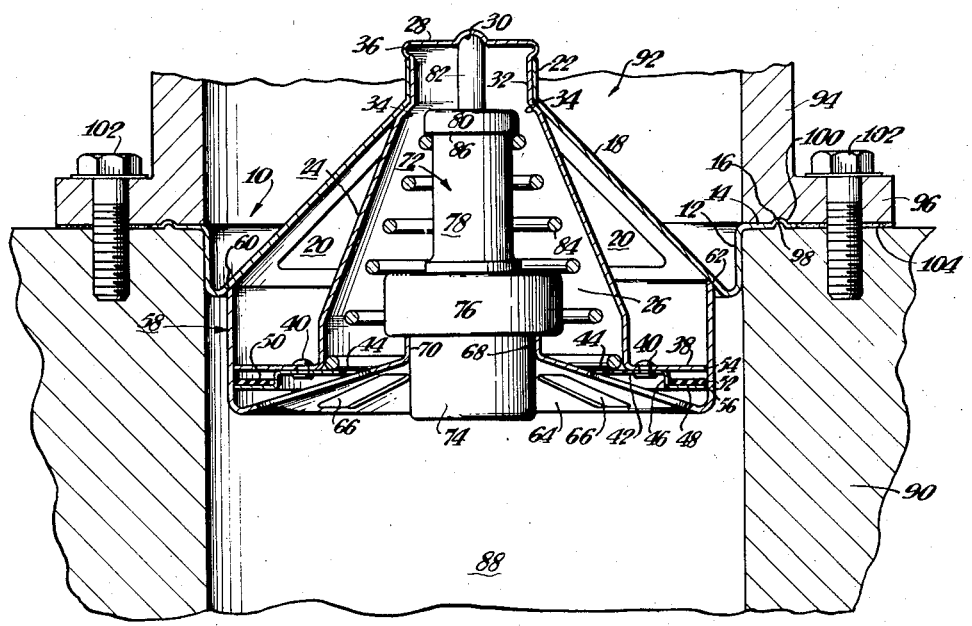
Fig. 2 is a section taken along the line II—II of Fig. 1 with some of the components of the valve shown in elevation and the valve installed in a position of intended use.

In assembly, as shown in Fig. 2, the cylindrical portion 32 of the housing 24 is adapted to tightly fit within the inner periphery of cylindrical portion 22 of the support member wall 18. Housing segment 34 and bead 36 function as abutments to prevent relative axial movement between the housing 24 and the support member wall 18, and the housing 24 is thereby rigidly anchored to the support member 10. If it is desired to further increase the rigidity of the assembly, cylindrical portion 22 of wall 18 and housing 24 can also be connected by welding or brazing or by any other suitable means (not shown).

The larger end of the housing 24 is provided with a substantially right angular, radially extending guide flange 38 thereon. Guide flange 38 has attached thereto by any suitable means, such as rivets 40, a support means or annular plate 42. Plate 42 is provided with a large, centrally located aperture 44 therein and a vertical offsetting annular wall 46 which terminates in an annular flange 48.

A resilient, "floating type" seal 50 is carried by flange 48 and the outer periphery 52 of the seal is adapted to substantially coincide with the peripheries 54 and 56 of the guide flange 38 and plate flange 48, respectively. Seal 50 "floats" or is movable in the space between guide flange 38 and plate flange 48, as will be discussed more in detail hereinafter.

Mounted for slidable movement on the peripheral surfaces 52, 54, and 56 is a hollow, cylindrical-shaped, choker sleeve valve member 58. Valve member 58 is provided with a beveled end wall 60 thereon which is adapted to seat on the undersurface of the support member upwardly converging wall 18 at 62, wall 18 at 62 thereby functioning as a valve seat. The opposite end of valve member 58 is provided with an upwardly and inwardly converging end wall 64 having a plurality, in this instance eight, of equally spaced apertures or ports 66 therein. End wall 64 terminates at the inner end thereof in an axially extending cylindrical portion 68 which defines a centrally located port 70 in the valve member 58.

A pressure insensitive, wax-fusion type thermostat or thermally responsive means, generally designated by the reference numeral 72, is positioned between the valve member 58 and the end wall 28 of housing 24. The thermostat 72 includes a casing 74, a clamping and sealing band 76, a hollow cylindrical member 78 which terminates at the free end thereof in an enlarged head 80, and an extensible and retractible piston 82 which is slidably received within the inner bore (not shown) of cylindrical member 78. The casing member 74 is filled with a wax-like substance (not shown) which changes from a solid to a liquid at a predetermined temperature and produces movement of a diaphragm (not shown) located in the band 76 which in turn imparts movement to the extensible and retractible piston 82.

Thermostat 72 is a pressure insensitive-type thermostat since it is insensitive to static or system pressures in a fluid in which it may operate or may be submerged, such as the static or system pressures in the cooling system of an internal combustion engine. These static or system pressures when applied to the thermostat extensible and retractible piston 82 will be transmitted to the diaphragm and wax-like substance within the thermostat 72, but the wax-like substance is for all practical purposes incompressible. In view of this incompressibility, the movement of the thermostat piston 82, therefore, is not affected by static or system pressures or by any change in external loading. Inasmuch as thermostats of this type are well known in the art, further discussion of the structure and function of the thermostat per se is deemed unnecessary.

In assembly, the casing member 74 of the thermostat 72 is rigidly carried or retained within the centrally located port 70 in the valve member 58, and the extensible and retractible piston 82 of the thermostat 72 is seated within recess 30 of housing end wall 28. The thermostat 72 and the valve member 58 are rigidly retained in assembled engagement preferably by press fitting thermostat casing 74 into port 70; however, these two components may be connected by any other suitable method or means, such as welding or brazing. With the valve member 58 and the thermostat 72 so connected, it will be readily understood that when piston 82 extends in response to an increase in volume of the wax-like substance in casing 74, the other components of the thermostat 72 will be displaced axially relative thereto and the valve member 58 will be moved in a direction away from the valve seat 62.

The movement of the valve member 58 by the thermostat 72 is opposed by the thrust of a compression spring 84. The compression spring 84 has one end thereof seated on a portion of the apertured plate or support means 42 that extends inwardly of the larger end of the housing 24, and the opposite end thereof is seated on the undersurface 86 of the head 80 on the free end of thermostat member 78. It will be noted that the compression spring 84 constantly urges the valve member 58 toward engagement with valve seat 62.

*Operation*

Referring to Fig. 2, the subject valve is shown installed between the mating ends of a pair of conduits, such as a fluid coolant conduit 88 in the head 90 (shown cutaway) of an internal combustion engine and a conduit 92 in a fluid manifold 94 (shown cutaway) having a retaining flange 96 thereon. The bead 16 on support member flange 14 is adapted to register with an annular bead 98 on engine head 90 and an annular recess 100 in manifold flange 96, and the flange 14 is rigidly retained in the installed position by a pair of bolts 102 which tightly anchor the manifold 94 to the engine head 90. A gasket 104 is positioned between the manifold flange 96 and the engine head 90 to prevent possible fluid leakage.

With the valve so positioned, it will be noted that the casing 74 of the thermostat 72 projects downwardly into the coolant conduit 88 where it is always exposed to the maximum velocity of fluid flow therein. This structural arrangement enables the wax-like substance in casing member 74 to instantaneously and accurately reflect the variations in temperature of the fluids passing through conduit 88.

It will also be noted that the compression spring 84 has moved the valve member 58 to the "closed" position. In this position of the valve member 58, the passage of fluid between conduits 88 and 92 will be prevented by the engagement of the valve member end wall 60 with valve seat 62 and by the engagement of the "floating" seal 50 with the inner periphery of the valve member 58.

If the temperature of the fluid in conduit 88 should increase sufficiently to produce an extension of thermostat piston 82, the other components of the thermostat 72 will be moved downwardly or axially relative thereto to thereby unseat the valve member 58. The fluid in conduit 88 will then flow over the valve member end wall 60 and pass through the plurality of ports 20 in support member wall 18 into manifold conduit 92.

If the temperature of the fluid in conduit 88 should decrease after the valve member 58 has been moved to the "open" position, piston 82 of thermostat 72 will be retracted by the thrust of compression spring 84 and the valve member 58 will be moved back into engagement with the valve seat 62.

In moving between the "open" and "closed" positions, it will be noted that the valve member 58 is guided and stabilized by the peripheral surfaces 54 and 56 of the guide flange 38 and plate flange 48, respectively, in combination with the peripheral surface 52 of the "floating" seal 50. Although not shown in the drawing, the "float-ing" seal 50, in the event of a pressure difference thereacross, will be moved upwardly and outwardly from its position in Fig. 2 whereby the peripheral surface 52 thereof will be tightly urged into sealing engagement with the inner periphery of the valve member 58. Therefore, in addition to stabilizing the movement of the valve member 58, the "floating" seal 50 also prevents the leakage of fluid past the valve in all of the controlling positions of the valve member 58.

It will also be noted that the sleeve valve member 58, in all of the controlling positions thereof, is pressure balanced or insensitive to variations in fluid pressure, i. e., variations in fluid pressure in conduit 88 will not produce any axial movement of the valve member 58. Ports 66 eliminate any unbalanced pressure areas on the valve member 58 below "floating" seal 50 and plate flange 48, and the fluid pressure forces which would otherwise tend to produce axial movement of the valve member 58 are absorbed by the guide flange 38, the plate or support means 42, and the inner surface of chamber 26 of housing 24. Similarly, the fluid pressure forces in conduit 88 which act on the valve member 58 above "floating" seal 50 and guide flange 38 will be applied radially to the valve member 58 and will obviously produce no axial movement thereof. This pressure balance or pressure insensitivity of the valve member 58 is especially important since it prevents the transmittal of axial forces to the thermostat 72 in the event of pressure drops across the valve member 58 whereby the thermostat 72 will control the movement of the valve member 58 only in response to variations in fluid temperature.

While the present invention has been herein shown and described in connection with the cooling system of an internal combustion engine, it will be understood that the invention is not to be limited to this particular environmental application. Quite obviously, a thermostatically operated valve constructed in accordance with the present invention can be advantageously utilized in any environmental application wherein it is desirable to use a balanced choker-type sleeve valve which is provided with a valve member controlled by a thermostat and resilient means and guided by a pair of flanges and a seal to move between a plurality of controlling positions relative to a valve seat formed on a support member.

Furthermore, while only one embodiment of the present invention has been herein shown and described, it will be apparent to those skilled in the art that the construction and arrangement of parts may be variously embodied or changed without departing from the scope of the invention as defined in the appended claims.

It is claimed and desired to secure by Letters Patent:

1. In a balanced pressure insensitive valve for controlling the flow of fluid, the combination comprising an apertured support member, a valve seat on said support member, a housing carried by said support member and provided with guide means thereon, support means carried by said guide means, sealing means carried by said support means, a valve member operatively engageable with said guide means, said support means and said sealing means and being movable between a plurality of flow controlling positions relative to said valve seat, said valve member having a plurality of ports therein, and pressure insensitive thermally responsive means operatively associated with said valve member for imparting movement thereto in response to changes in a temperature condition, said ports in said valve member and sealing means being operable to insure a fluid pressure balance across said valve member in all of the controlling positions thereof.

2. A valve for controlling the flow of fluid in a conduit or the like comprising a flanged support member having a plurality of fluid ports therein, a valve seat on said support member, a housing carried by said support member and provided with guide means thereon, said housing having a recessed end wall closing one end thereof, support means carried by said guide means and defining an annular recess between said support means and guide means, seal means carried by said support means in said annular recess, a valve member cooperable with said guide means, said support means and said seal means and being movable between a plurality of controlling positions relative to said valve seat, said valve member having a plurality of ports therein, pressure insensitive thermally responsive means rigidly connected to said valve member and operatively engageable with said recessed end wall of said housing for producing movement of said valve member in response to changes in the temperature of said fluid, and resilient means operatively engageable with said support means and said thermally responsive means for opposing the movement of said valve member by said thermally responsive means, said seal, said guide means, said support means and said ports in said valve member being operable to insure a fluid pressure balance across said valve member in all of the controlling positions thereof.

3. In a balanced valve for controlling the flow of fluid in a conduit or the like, the combination comprising a flanged support member having a plurality of fluid ports therein, a valve seat on said support member, a housing carried by said support member and provided with a single end wall and guide means thereon, support means carried by said guide means, a seal carried by said support means and being positioned between said guide means and said support means, a valve member operatively engageable with said guide means, said support means and said seal and being movable between a plurality of flow controlling positions relative to said valve seat, said valve member having a plurality of fluid ports therein, pressure insensitive thermally responsive means including a hollow member having an enlarged head thereon and a movable piston for imparting movement to said valve member in response to changes in the temperature of said fluid, said thermally responsive means being rigidly connected to said valve member and said movable piston thereof being seated on said housing end wall, and resilient means having one end seated on said enlarged head on said thermally responsive means and the opposite end thereof seated on said support means for opposing the movement of said valve member by said thermally responsive means, said seal, said guide means, said support means and said ports in said valve member being operable to insure a fluid pressure balance across said valve member in all of the controlling positions thereof.

4. In a balanced valve as claimed in claim 3 wherein said housing is closed at one end by said end wall and open at the opposite end thereof, and wherein said guide means is comprised of a flange extending radially of said housing from the open end thereof.

5. In a balanced valve as claimed in claim 3 wherein said support means is comprised of an annular plate having a centrally located aperture therein and provided with a flange portion adjacent the outer periphery for supporting said seal.

References Cited in the file of this patent

UNITED STATES PATENTS

| | | |
|---|---|---|
| 1,639,286 | Carson | Aug. 16, 1927 |
| 2,469,930 | Payne | May 10, 1949 |
| 2,829,834 | Drapeau | Apr. 8, 1958 |